United States Patent [19]

Matsumoto et al.

[11] Patent Number: 5,379,609
[45] Date of Patent: Jan. 10, 1995

[54] AIR CONDITIONER HAVING AIR FILTER

[75] Inventors: Kensuke Matsumoto, Gunma; Yasutomo Akutu, Maebasi; Masao Koseki, Kazo; Michio Kurakami, Ashikaga; Yoshiyuki Kitamura, Sano; Kiyoshi Koyama, Isesaki, all of Japan

[73] Assignee: Sanyo Electric Co., Ltd., Oosaka, Japan

[21] Appl. No.: 105,150

[22] Filed: Aug. 12, 1993

[30] Foreign Application Priority Data

Aug. 24, 1992 [JP] Japan .................................. 4-224132
Feb. 17, 1993 [JP] Japan .................................. 5-053060

[51] Int. Cl.6 .................... B01D 46/00; F24F 1/00
[52] U.S. Cl. .................................. 62/262; 454/207; 454/201; 55/492; 55/509; 55/DIG. 31
[58] Field of Search ........................ 62/262, 298, 411; 454/201, 202, 207, 224; 55/385.2, 490, 492, 509, 511, DIG. 31

[56] References Cited

U.S. PATENT DOCUMENTS

| | | | |
|---|---|---|---|
| 2,297,729 | 10/1942 | Thomas | 55/511 X |
| 3,058,279 | 10/1962 | Metcalfe | 55/DIG. 31 X |
| 3,778,985 | 12/1973 | Daigle et al. | 55/497 |
| 4,018,159 | 4/1977 | Bennett | 62/262 X |
| 4,045,350 | 8/1977 | Kupf et al. | 210/232 |
| 5,125,239 | 6/1992 | Kobayashi et al. | 62/262 |

FOREIGN PATENT DOCUMENTS

| | | | |
|---|---|---|---|
| 27138 | 2/1984 | Japan | 454/207 |
| 291033 | 11/1989 | Japan | 454/207 |

Primary Examiner—Henry A. Bennet
Assistant Examiner—William C. Doerrler
Attorney, Agent, or Firm—Sughrue, Mion, Zinn, Macpeak & Seas

[57] ABSTRACT

In an air conditioner having an air filter comprising a frame body and a mesh which are integrally formed, a specific portion 140 of the frame body 132 is wider than the other portions of the frame body, and a support post 130 which is engageable with a latch slot 131 on the main body is disposed at the widened portion, so that even when the joint between the frame body and the mesh is formed away from the support post, the mechanical strength of the post can be maintained. In addition, the width of the joint at the widened portion is substantially equal to that of the other portions of the joint, so that the mesh is uniformly fixed to the frame body.

11 Claims, 15 Drawing Sheets

AIR CONDITIONER HAVING AIR FILTER

BACKGROUND OF THE INVENTION

1. Field of the Invention

This invention relates to an air filter for an air conditioner, which comprises a frame body and a mesh secured to the frame body.

2. Description of Related Art

The applicant of this application previously proposed an air filter for an air conditioner as disclosed in Japanese Patent Application No. 3-312593. This air filter is designed to be secured to an air suction port of the air conditioner, and comprises a frame body and a mesh secured to the frame body.

FIG. 1 shows an enlarged schematic view of a main part of the air filter as described above, and FIG. 2 is a cross-sectional view of the air filter as shown in FIG. 1 which is taken along a line VII—VII. The conventional air filter 250 as shown in FIG. 1 has been formed as follows. A mesh 253 which is formed of polypropylene resin or the like is disposed in a metal mold, and then ABS resin or the like is injected into the mold to integrally form a frame body 251 with the mesh 253. That is, the frame body 281 and the mesh 253 which constitute the air filter 250 as described above are formed of ABS resin and Polypropylene respectively.

In addition, a projecting support piece 282 is provided at the back side of the frame body 251 so as to be pinched by a latch provided at an air suction port of the air conditioner. The support piece 252 is also formed of ABS resin in the injection molding process where the frame body 251 is integrally formed while disposing the mesh 253 in the mold.

In this type of air filter, as shown in FIG. 2, a joint portion 254 between the frame body 251 and the mesh 253 is formed so as to extend over the base portion 252a of the support piece in the above injection molding process. The frame body 251 and the mesh 253 are formed of different materials (i.e., ABS resin and Polypropylene respectively), and thus the adhesiveness therebetween at the joint portion 254 is degraded. Since the joint portion 254 is formed so as to extend over the base portion 252a of the support piece 252 as described above, the support piece 252 may be damaged (e.g., bent or broken) when the support piece 252 is kept under strong force while pinched by the latch. The bending or breaking of the support piece 252 disenables the air filter to be secured to the air conditioner.

In order to avoid the above disadvantage, the joint portion 254 may be designed not to extend over the base portion 252a of the support piece 252 (i.e., to avoid the base portion 252a of the support piece 252) and so that a portion of the joint portion 254 in the neighborhood of the support piece 252 has a smaller width than that of the other portions thereof. However, in such construction, the mesh 253 and the frame body 252 would be liable to be detached from each other.

SUMMARY OF THE INVENTION

An object of this invention is to provide an air conditioner having an air filter in which a support piece is hardly damaged and a mesh is hardly detached from a frame body. In order to attain the above object, the air filter is integrally formed of a frame body and a mesh, and the frame body is so designed that a portion thereof is wider than the other portions thereof, The support piece is disposed at the wider portion.

According to this invention, a portion of the frame body is designed to be wider than the other portions thereof, and the support piece is disposed at the wider portion, Therefore, the joint portion between the frame body and the mesh can be formed away from the support piece while maintaining the mechanical strength of the support piece. In addition, the width of the surrounding portion of the joint portion at the above portion can be kept substantially equal to that of the other portions of the joint portion, so that the mesh is hardly detached from the frame body.

DETAILED DESCRIPTION OF THE PREFERRED EMBODIMENTS

A preferred embodiment according to this invention will be described hereunder with reference to the accompanying drawings.

Figure 3:
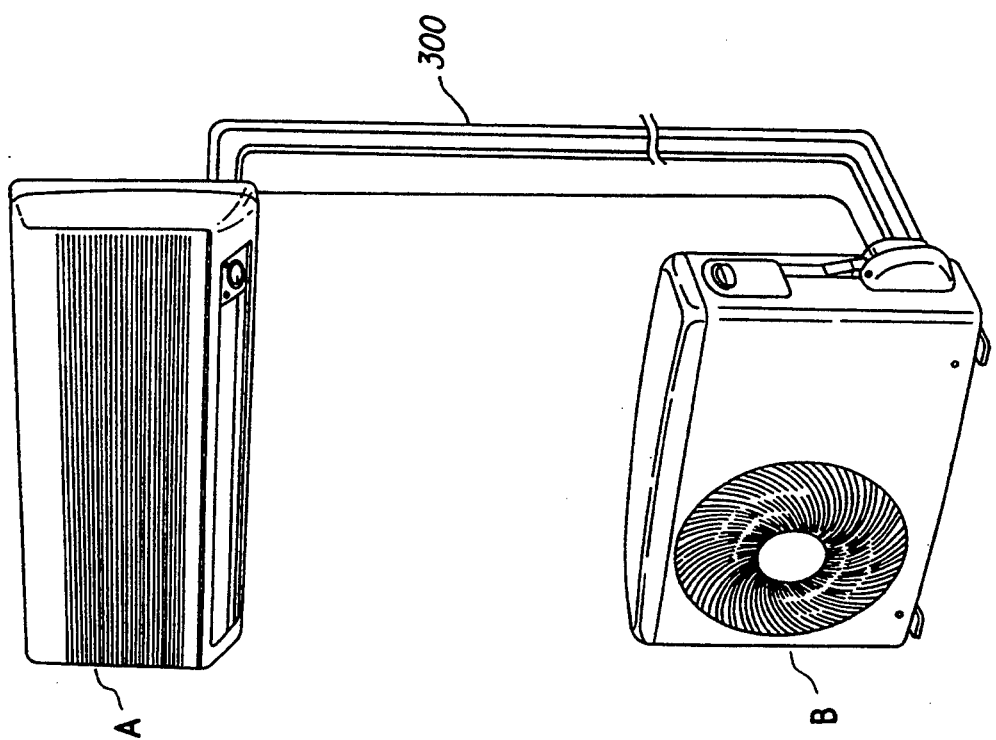
FIG. 3 is a perspective view of an embodiment of an air conditioner to which this invention is applied.

FIG. 3 is a perspective view of a general domestic type of air conditioner to which this invention is applied. This type of air conditioner includes an indoor unit (use side unit) A which is disposed inside a room, and an outdoor unit (heat source side unit) B which is disposed outside the room, and these indoor and outdoor units A and B are connected to each other through a refrigerant pipe 300.

Figure 1:
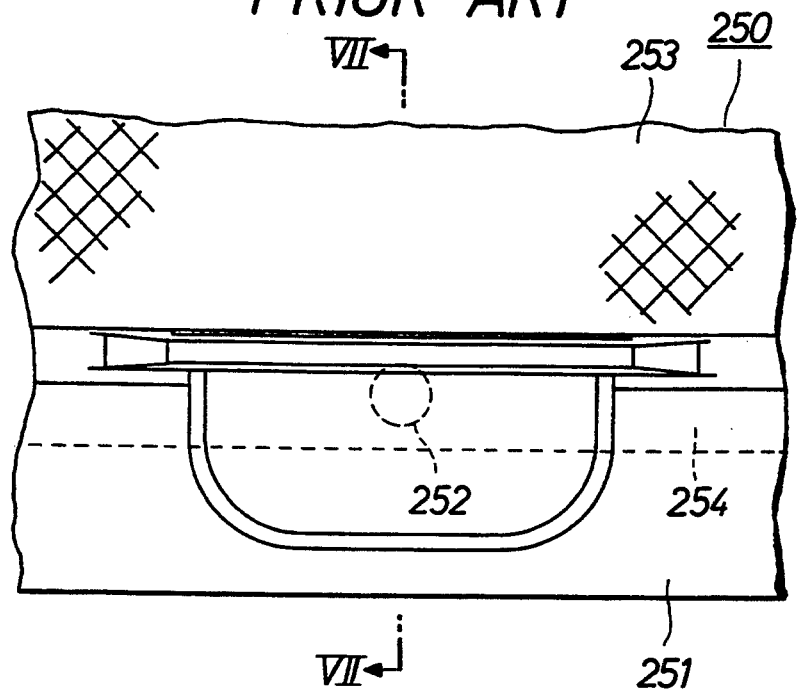
FIG. 1 is an enlarged front view of a main part of a conventional air filter.
Figure 2:
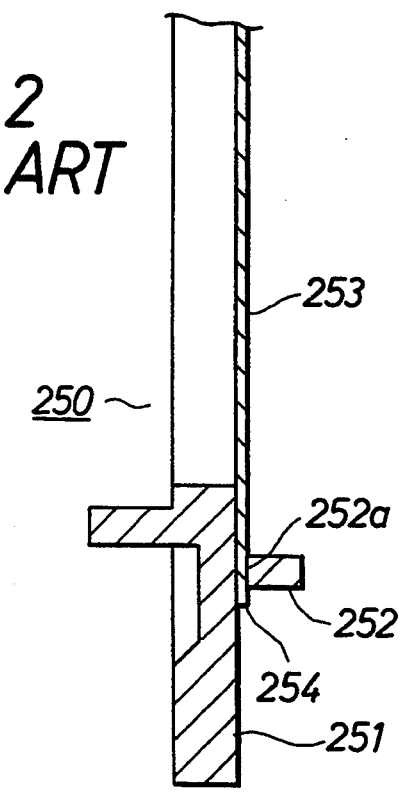
FIG. 2 is a cross-sectional view of the conventional air filter of FIG. 1, which is taken along a line VII—VII.
Figure 4:
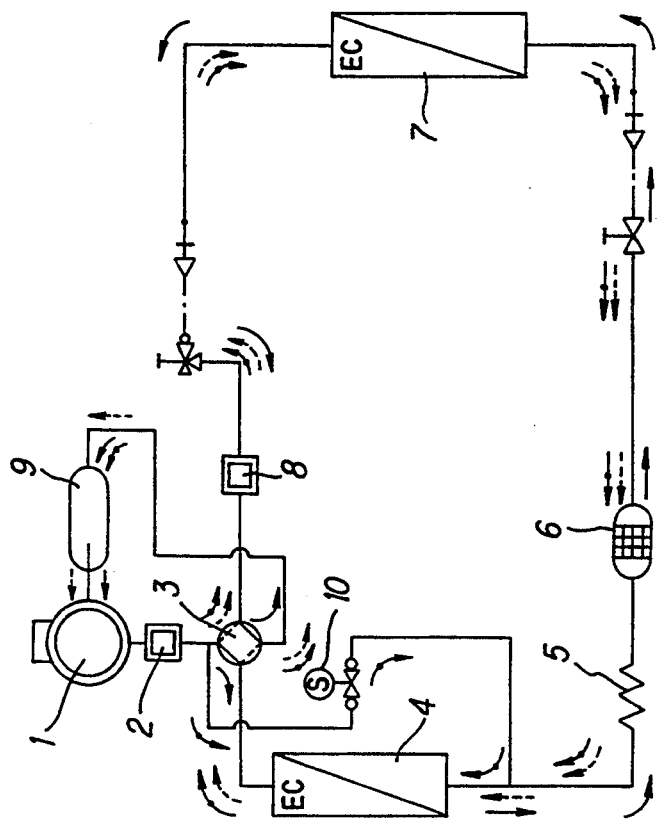
FIG. 4 is a refrigerant circuit diagram for the air conditioner as shown in FIG. 3.

FIG. 4 is a refrigerant circuit diagram showing a refrigeration cycle in the air conditioner as shown in FIG. 3.

In FIG. 4, reference numeral 1 represents a compressor incorporating a motor element and a compression element driven by the motor element; 2, a muffler for suppressing vibration and noise due to pulsation of a refrigerant discharged from the compressor 1; 3, a four-way valve for switching the flow direction of the refrigerant in a cooling/heating(warming) operation; 4, a heat exchanger at a heat source side (outdoor side); 5, a capillary tube (expansion device); 6, a screen filter; 7, a heat exchanger at a use side (indoor side); 8, a muffler; 9, an accumulator, and 10, a solenoid valve.

The refrigerant discharged from compressor 1 selectively flows in one of three directions corresponding to three modes which are respectively indicated by the solid arrows (cooling operation), the broken arrows (heating operation) and the dotted arrows (defrosting operation) in accordance with the state (switching position) of the four-way valve 3 and the opened/closed state of the solenoid valve 10. In a cooling operation, the heat-source-side heat exchanger 4 serves as a condenser, whereas the use-side heat exchanger 7 serves as an evaporator. In a heating operation, the use-side heat exchanger 7 serves as a condenser, whereas the heat-source-side heat exchanger 4 serves as an evaporator. In a defrosting operation (during a heating operation), a part of the high-temperature refrigerant discharged from the compressor 1 is directly supplied to the heat-source-side heat exchanger 4 to raise the temperature of the heat-source-side heat exchanger 4, thereby performing a drying operation therein while conducting the heating operation. In such a case where the defrosting operation does not sufficiently function (for example, outdoor temperature is extremely low), the defrosting operation is forcedly carried out in an inverse-cycle defrosting mode (in the flow direction as indicated by the solid arrows).

Figure 5:
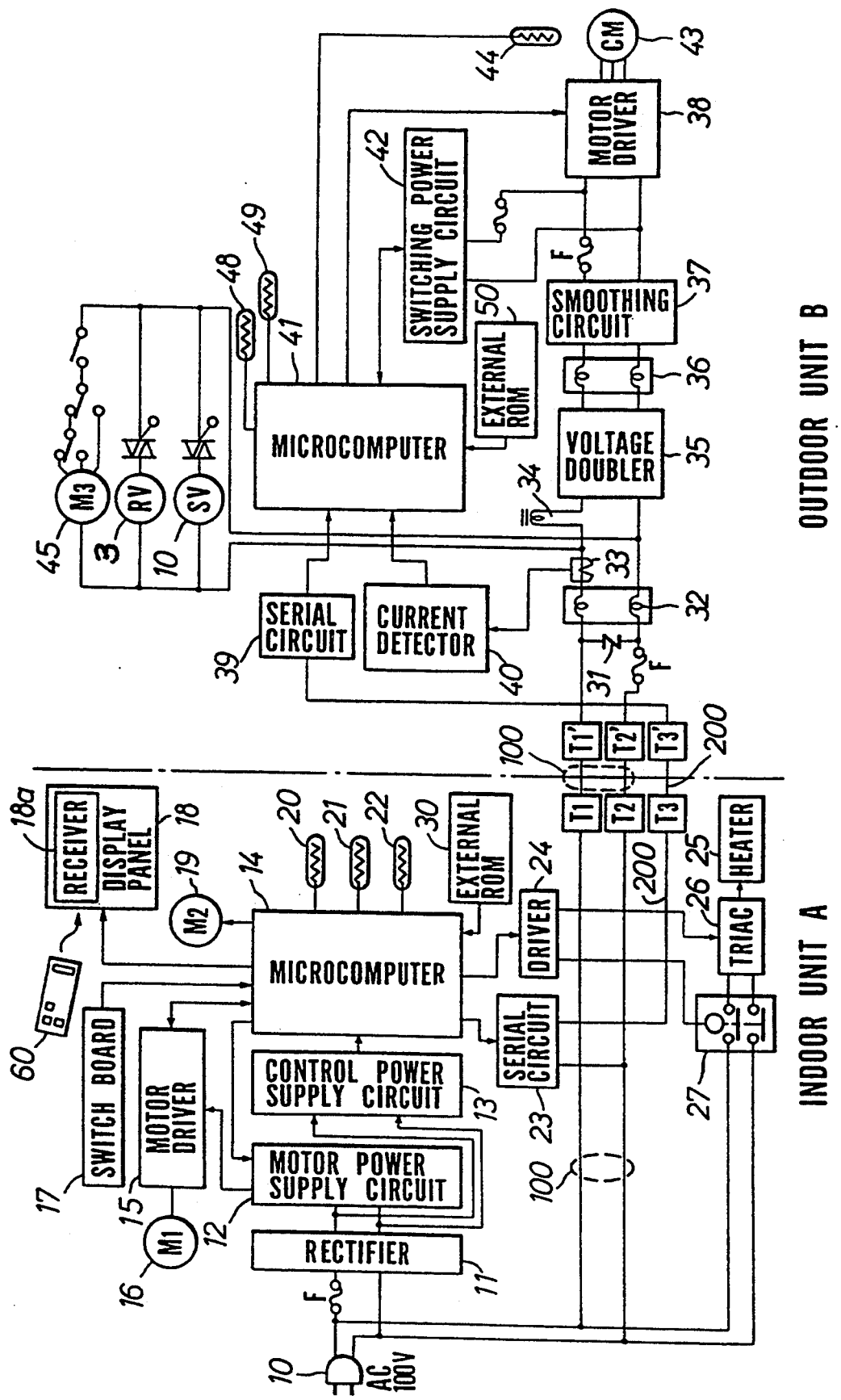
FIG. 5 is a diagram for a control circuit for the air conditioner as shown in FIG. 3.

FIG. 5 is a diagram showing a control circuit for the air conditioner to which this invention is applied. The circuit portion located on the left side of the one-dotted chain line drawn in the middle of FIG. 5 corresponds to a control circuit arranged in an indoor unit A, and the circuit portion located on the right side corresponds to a control circuit arranged in an outdoor unit B. The two control circuits are connected to each other through power lines 100 and a communication (control) line 200.

The control circuit in the indoor unit A comprises a rectifier 11, a power supply circuit 12 for motors, a power supply circuit 13 for a control operation, a motor driver 15, a switch board 17, a receiver 18a, a display panel 18, and a flap motor ($M_2$) 19. the rectifier 11 rectifies an AC, voltage of 100 [V] applied by a plug 10a. The power supply circuit 12 for motors adjusts a DC voltage, which is applied to a DC fan motor (brushless motor) ($M_1$) 16 for blowing cool air into a room to be air-conditioned, into a voltage of 10 to 36 [V] in accordance with a signal from a microcomputer 14. The power supply circuit 13 generates a DC voltage of 5 [V] to be applied to the microcomputer 14. The motor driver 15 controls the energization (current supply) timing of the stator winding of the DC fan motor 16 in response to a signal from the microcomputer 14, which is based on rotational position information on the DC fan motor 16. The switch board 17 is fixedly mounted on an operation panel for the indoor unit A. An ON/OFF switch, a test run switch and the like are arranged on the switch board 17. The receiver 18a receives a remote operation signal (e.g., an ON/OFF signal, a cooling/heating switching signal, or a room temperature setting signal) from a wireless remote controller 60. The display panel 18 displays an operation status of the air conditioner. The flap motor 19 serves to move flaps for changing the blowing direction of cool/warm air.

In addition, the control circuit includes a room temperature sensor 20 for detecting the room temperature, a heat exchanger temperature sensor 21 for detecting the temperature of the indoor heat exchanger, and a humidity sensor 22 for detecting the room humidity. Those detection values which have been obtained by these sensors are A/D-converted to be fetched by the microcomputer 14. A control signal from the microcomputer 14 is transmitted to the outdoor unit B through a serial circuit 23 and a terminal board $T_{13}$. In addition, a triac 26 and a heater relay 27 are controlled by the microcomputer 14 through a driver 24, thereby performing phase control of power supplied to a reheating heater 25 used for a drying operation.

Reference numeral 30 represents an external ROM for storing "specific data" specifying the type and characteristics of the air conditioner. These specific data are fetched from the external ROM 30 immediately after the power supply switch is turned on and an operation is stopped. When the power supply switch is turned on, input of a command from the wireless remote controller 60 or detection of the status of the ON/OFF switch or the test run switch (whose operations will be described later9 are not performed until fetching of the specific data from the external ROM 30 is completed.

The control circuit for the outdoor unit will be next described.

In the outdoor unit B, terminal boards $T'_1$, , $T'_2$ and $T'_3$ are respectively connected to terminal boards $T_1$, $T_2$ and $T_3$ in the indoor unit A are arranged. Reference numeral 31 represents a varistor connected in parallel with the terminal boards $T'_1$ and $T'_2$; 32, a noise filter; 34, a reactor; 35, a voltage double rectifier for doubling a voltage; 36, a noise filter; and 37, a smoothing circuit (ripple filter) for obtaining a DC voltage of about 280 [V] from an AC voltage of 100 [V].

Reference numeral 39 represents a serial circuit for performing signal conversion of a control signal supplied from the indoor unit A through the terminal board $T'_3$ to transmit it to transmit it to a microcomputer 41; 40, a current detector for detecting a current supplied to a load in a current transformer (CT)33 of the outdoor unit B and smoothing the current into a DC voltage to supply the DC voltage to the microcomputer 41; 41, the microcomputer; 42, a switching power supply circuit for generating a power supply voltage for the microcomputer 41; and 38, a motor driver having six power transistors for performing PWM control of power supplied to a compressor motor 43 (to be described later) on the basis of a control signal from the microcomputer 41. The six power transistors of the motor driver 38 are connected in the form of a three-phase bridge, thus constituting a so-called inverter unit. Reference numeral 43 represents a compressor motor for driving the compressor for the refrigeration cycle; 44, a discharge temperature sensor for detecting the temperature of the refrigerant on the discharge side of the compressor; 45, a fan motor controlled in three steps of speed and designed to send air to the outdoor heat exchanger; and 3 and 10, a four-way valve and a solenoid valve, respectively, used to switch the paths of the refrigerant in the refrigeration cycle.

Further, in the outdoor unit B, an outdoor temperature sensor 48 for detecting an outdoor temperature is arranged in the vicinity of the air intake port, and a heat exchanger temperature sensor 49 for detecting the temperature of the outdoor heat exchanger is arranged. Detection values obtained by these sensors 48 and 49 are A/D-converted and fetched by the microcomputer 41.

Reference numeral 50 represents an external ROM having the same function as that of the external ROM 30 in the indoor unit A. The inherent data about the outdoor unit B, which are similar to those disclosed with reference to the external ROM 30, are stored in the ROM 50. Reference symbol F in each of the control circuits of the indoor unit A and the outdoor unit B represents a fuse.

Each of the microcomputers (control elements) 14 and 41 is designed such that a ROM for storing programs in advance, a RAM for storing reference data, and a CPU for executing the programs are housed in the same package (87C196MC (MCS-96 series) available from Intel Corporation).

Figure 6:
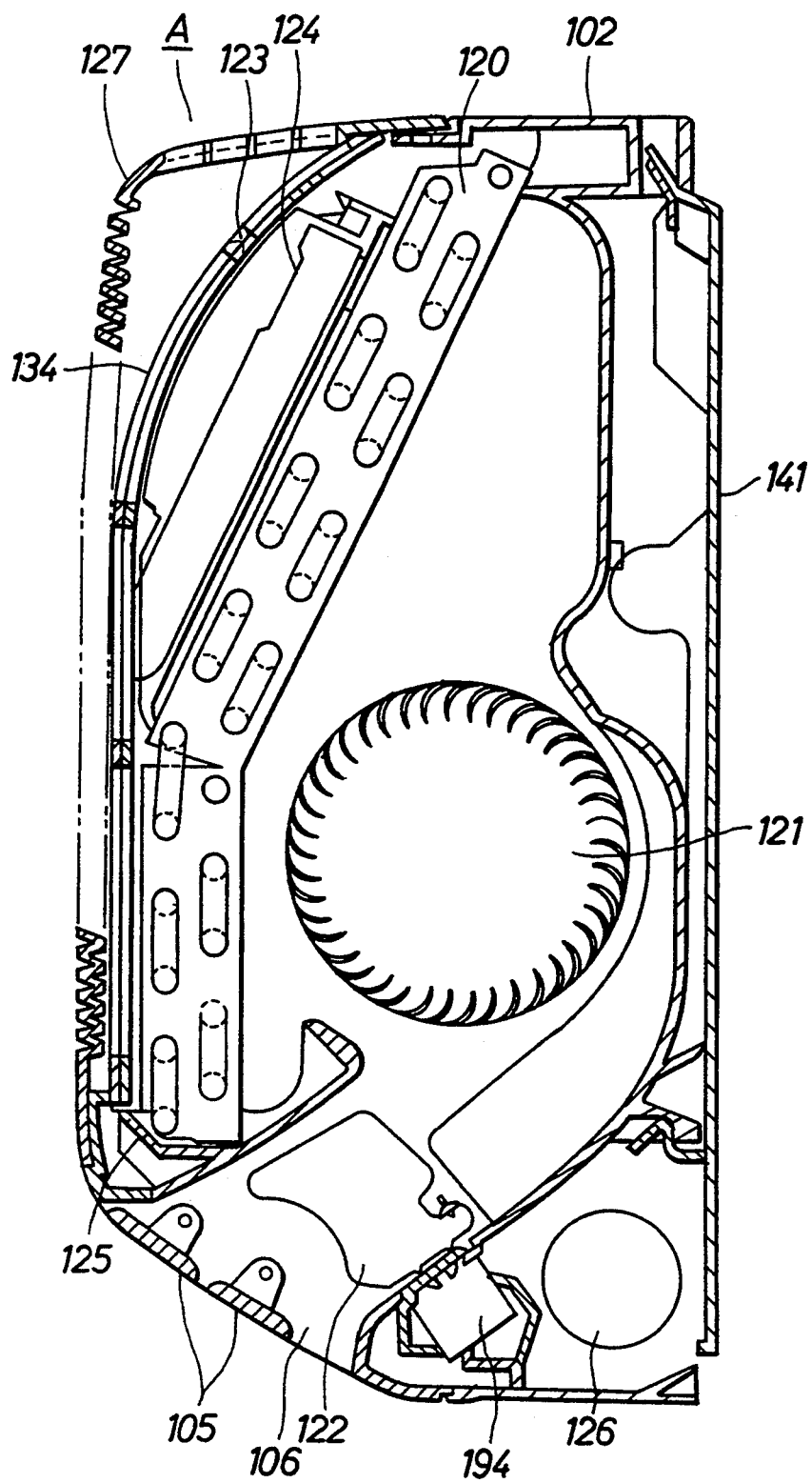
FIG. 6 is a longitudinal-sectional view of the air conditioner as shown in FIG. 3.

FIG. 6 is a longitudinal-sectional view of the indoor unit A.

In FIG. 6, reference numeral 120 represents a use-side (indoor side) heat exchanger; 121, a cross flow fan; and 122, longitudinal vanes. The longitudinal vanes 122 are disposed behind horizontal vanes 105 located at an air blow-out port 106. Reference numeral 123 represents an air filter (pre-filter) secured to the air suction (intake) port; 124, an air washer; 125, a drain pan; and 126, a refrigerant pipe. The air filter 123 is secured to the indoor unit A so as to be hung on the main body 102 of the indoor unit A.

Figure 7:
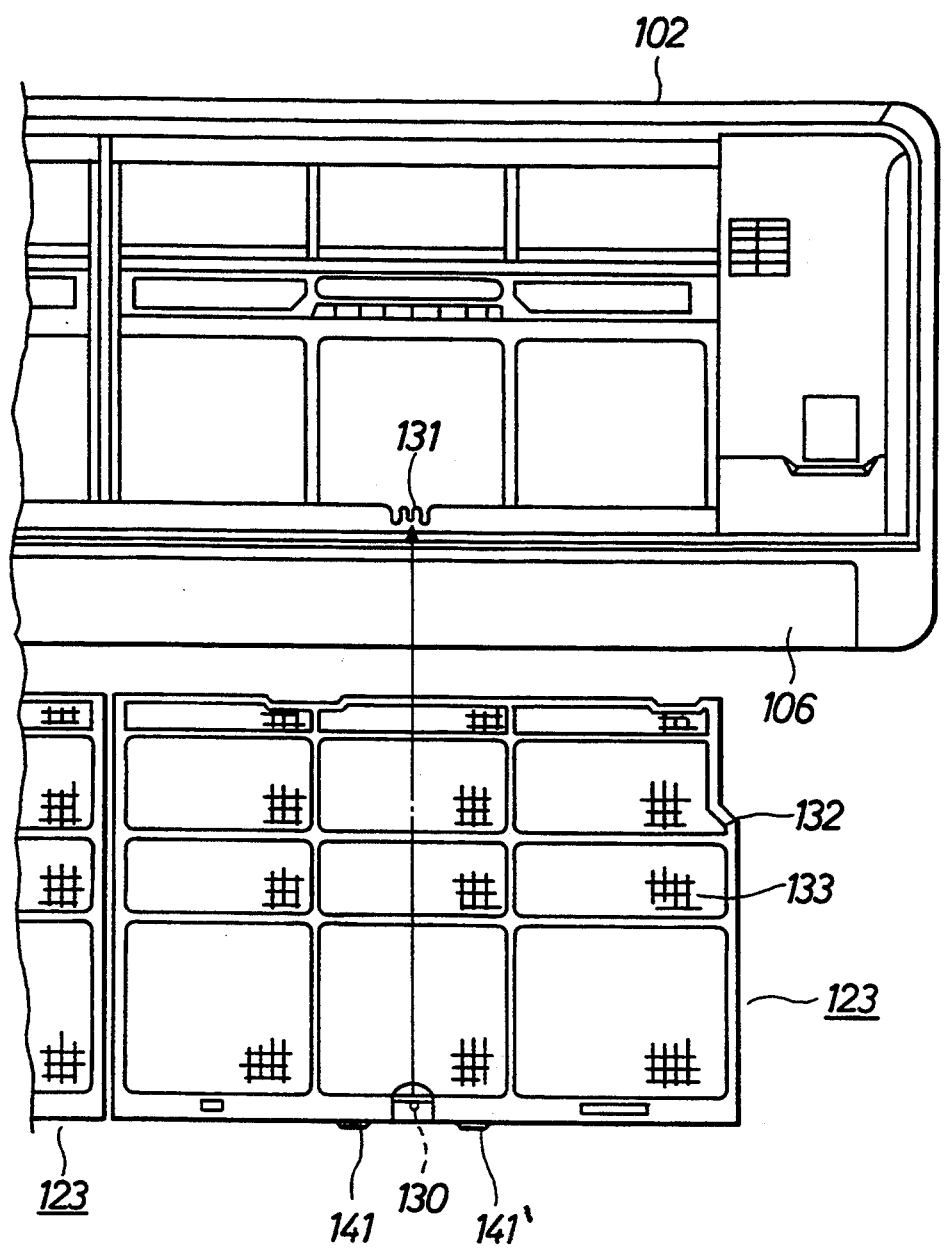
FIG. 7 is a front view of a main part showing the relationship between the air filter and the air conditioner.

FIG. 7 shows the main body 102 of the air conditioner and the air filter 123. The air filter 123 is provided with a projection support piece or post 130 at the lower portion of the air filter 123. The main body 102 is provided with a latch 131. The latch 131 is designed so as to pinch or sandwich the above support piece 130 therebetween, thereby fixedly securing the air filter to the main body 102 of the air conditioner.

Figure 8:
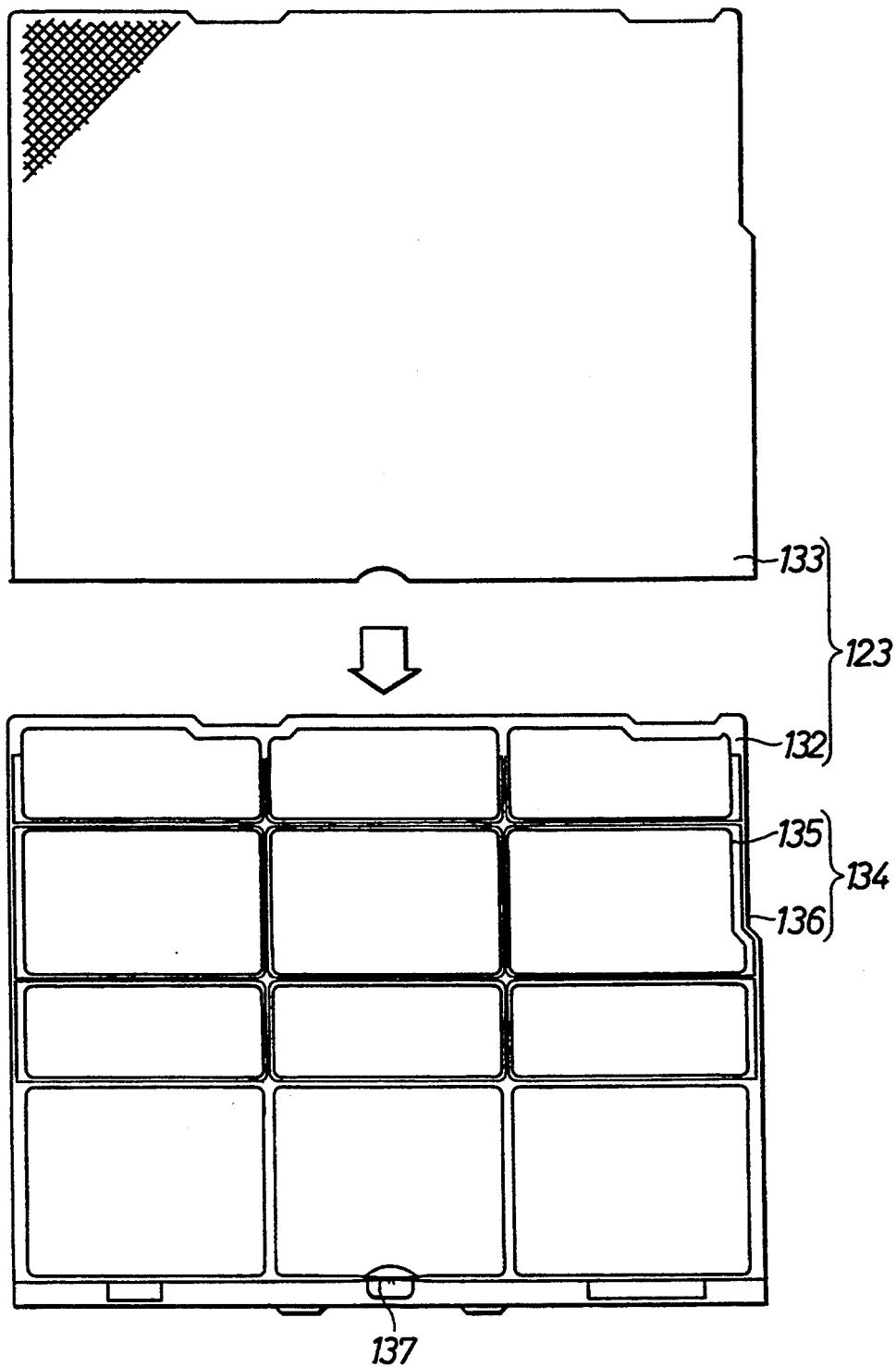
FIG. 8 is an exploded view showing the relationship between a frame body and a mesh of the air filter.

FIG. 8 is an exploded view showing the relationship between a frame body 132 and a mesh 133 of the air filter 123. As described later, the frame body 132 and the mesh 133 are integrally formed, and thus these elements do not exist independently of each other. However, in order to make the shape of these elements clear, they are illustrated to be separated from each other in FIG. 8. The frame body 132 of the air filter 123 has a bent or curved portion 134 as shown in FIG. 8, and the bent or curved portion 134 comprises a thick portion 135 and a rib portion 136.

Figure 9:
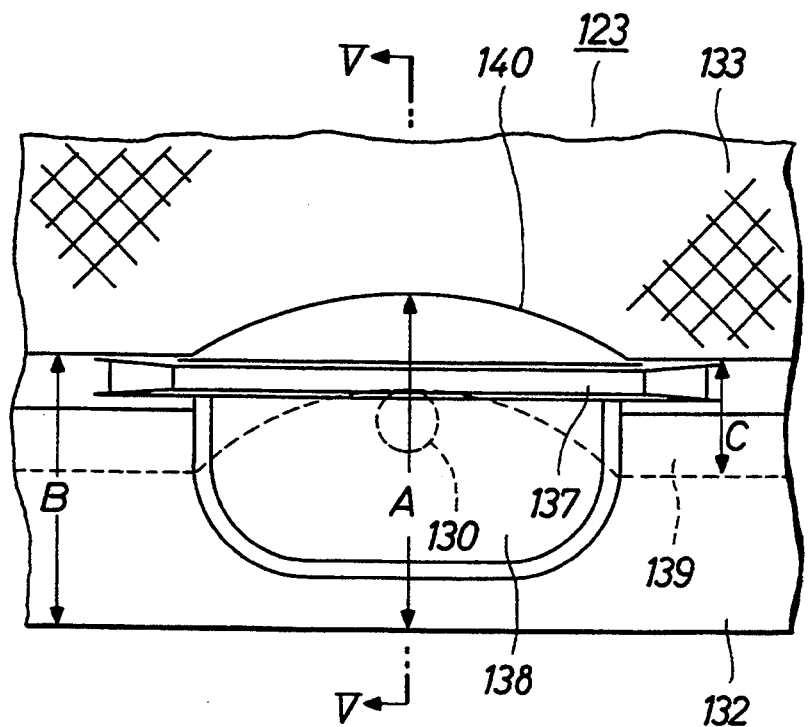
FIG. 9 is an enlarged front view of a main part of the air filter.
Figure 10:
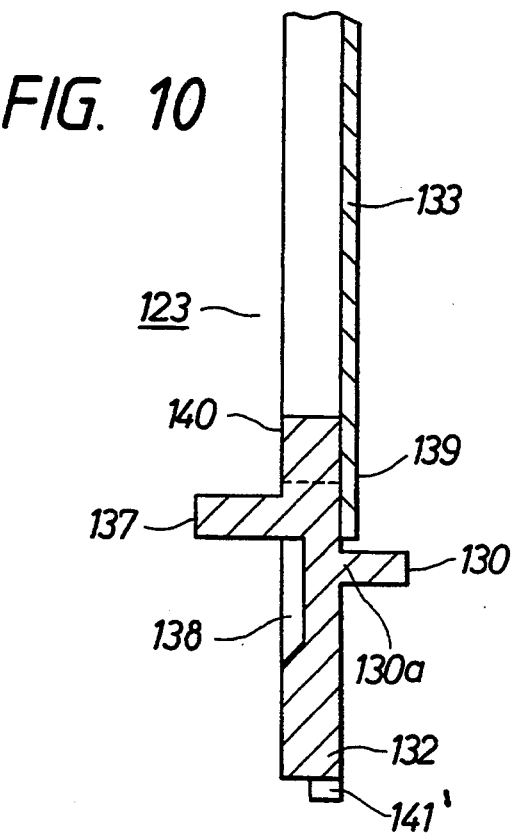
FIG. 10 is a cross-sectional view of the air filter which is taken along a line V—V of FIG. 9.

FIG. 9 shows an embodiment of the air filter according to this invention, and FIG. 10 is a cross-sectional view of the air filter which is taken along a line V—V of FIG. 9. In FIGS. 9 and 10, reference numeral 137 represents a tab which is provided at the lower portion on the front surface of the frame body 132 of the air filter 123, and the tab 137 is designed to be pinched by a user at a time when the air filter 123 is attached to or detached from the main body 102 of the air conditioner as described later. At the lower portion of the tab 137 (in FIG. 9) is formed a recess 138 which enables the user to pinch the tab 137 sufficiently. The above structure of the air filter of this embodiment is substantially similar to that of the conventional air filter. However, the following difference in structure exists between the air filter of this embodiment and the conventional air filter.

As shown in FIG. 9, the width A of a portion of the frame body 132, which surrounds the support piece 130 (hereinafter referred to as "surrounding portion"), is set to be larger than the width B of the other portions of the frame body 132. In addition, a projection portion 140 is provided at the surrounding portion so as to be projected to the side of the mesh 133. Here, the width A (B) is defined as the distance which is measured in the vertical direction of the air filter in FIG. 9.

Reference numeral 139 represents a joint portion between the frame body 132 and the mesh 133, and unlike the conventional air filter the joint portion 139 is designed such that it does not extend to the base portion 130a of the support piece 130. The width C of the joint portion 139 is set to such a value that the mesh 133 is not detached from the frame body 132. That is, the surrounding portion of the frame body 132 and the other portions of the frame body 132 away from the support piece 130 are designed to substantially have the predetermined width C. The frame body 132 is also provided with a hook piece 141' as shown in FIG. 10, and it is engaged with a recess portion (not shown) of the main body 102.

This air filter 123 thus constructed is integrally formed in a flat form, and then bent by heating as shown in FIG. 6. The process of forming this air filter 123 will be next described in detail.

The air filter 123 is formed as follows. First, a metal mold (not shown) is prepared to form the frame body 132 of the air filter in a flat form, and then a polypropylene-resin mesh 133 which is beforehand cut in a predetermined shape is sandwiched in the mold. Subsequently, synthetic resin material (ABS resin) is injected into the mold while the mesh 133 is sandwiched in the mold. After the molding process is terminated, the mold is opened, and a flat-shaped air filter 123 into which the frame body 132 and the mesh 133 are integrally formed is obtained.

In this case, the metal mold for forming the air filter 123 is designed in a flat shape, so that the mesh 133 is prevented from positionally deviating in the mold. Therefore, unlike the conventional process, it is unnecessary to use a relatively-large mesh 133 and carry out a post-treatment (a process of cutting an extruded portion of the mesh). In addition, the air filter 123 can be easily manufactured at low cost because a mesh 133 which is cut in a predetermined-shape is usable.

This air filter 123, after being formed in a flat shape, is bent while sandwiched in a heated mold. Since at this time the frame body 132 is provided with the bent or curved portion 134 comprising the thick portion 135 and the rib portion 136, heat is liable to be transmitted to the thick portion 135 of the bent portion 134, and thus the bending process can be easily performed.

The air filter 123 thus bent is secured to the main body 102 by opening an air suction panel 127 (see FIG. 6). The air filter 123 is hardly deformed in a state where it is secured to the main body 102, and also is kept properly rigid by the rib portion 136 formed on the bent portion 134, so that the air filter 123 is not deformed in use.

Attachment and detachment of the air filter 123 to and from the main body 102 are performed as follows.

For the attachment of the air filter 123 to the main body 102, the upper portion of the frame body 132 of the air filter 123 is contacted with the upper portion of the main body 102 of the air conditioner, and then the tab 137 at the lower portion of the frame body 123 is pinched by the user to engage the support piece 130 with the latch 131 and simultaneously to hang the hook piece 141' on the lower portion of the main body 102, thereby securing the air filter 123 to the air suction port of the main body 102 of the air conditioner. The support piece 130 snaps when it is engaged with the latch 131 or detached from the latch 131, so that it can be easily confirmed whether the air filter 123 is completely secured to the main body 102 of the air conditioner or detached from the main body 102. For the detachment of the air filter 123 from the main body 102 of the air conditioner, the above operation may be inversely carried out.

Through the attachment and detachment of the air filter 123, a relatively strong force is liable to be applied to the support piece 130 because the support piece 130 is pinched by the latch 131. According to this embodiment, the joint portion 139 between the frame body 132 and the mesh 133 is designed such that it does not extend to the base portion 130a of the support piece 130, and there exists no different material or member such as the mesh 133 (of polypropylene resin or the like) between the base portion 130a (ABS resin) of the support piece 130 and the frame body 132 (ABS resin). Therefore, since the frame body 132 and the support piece 130 are integrally formed of the same material (ABS resin) with no different material being intermixed therewith, the joint strength between the frame body 132 and the support piece 130 is kept high. Therefore, the support piece 130 of the air filter 123 is hardly damaged, and thus the life time of the air filter 123 can be lengthened.

In addition, the frame body 132 is provided with the projection portion 140, and the width A of the surrounding portion of the frame body 132 is set to be larger than the width B of the other portions. Therefore, as shown in FIG. 9, although the mesh 133 is provided to avoid the base portion 130a of the support piece 130, the width C of the joint portion 139 at the surrounding portion of the frame body 130 is kept to be substantially identical to that of the joint portion 139 at the other portions of the frame body 130, so that the joint strength between the frame body 132 and the mesh 133 becomes higher and the mesh 133 is hardly detached from the frame body 132.

Figure 11:
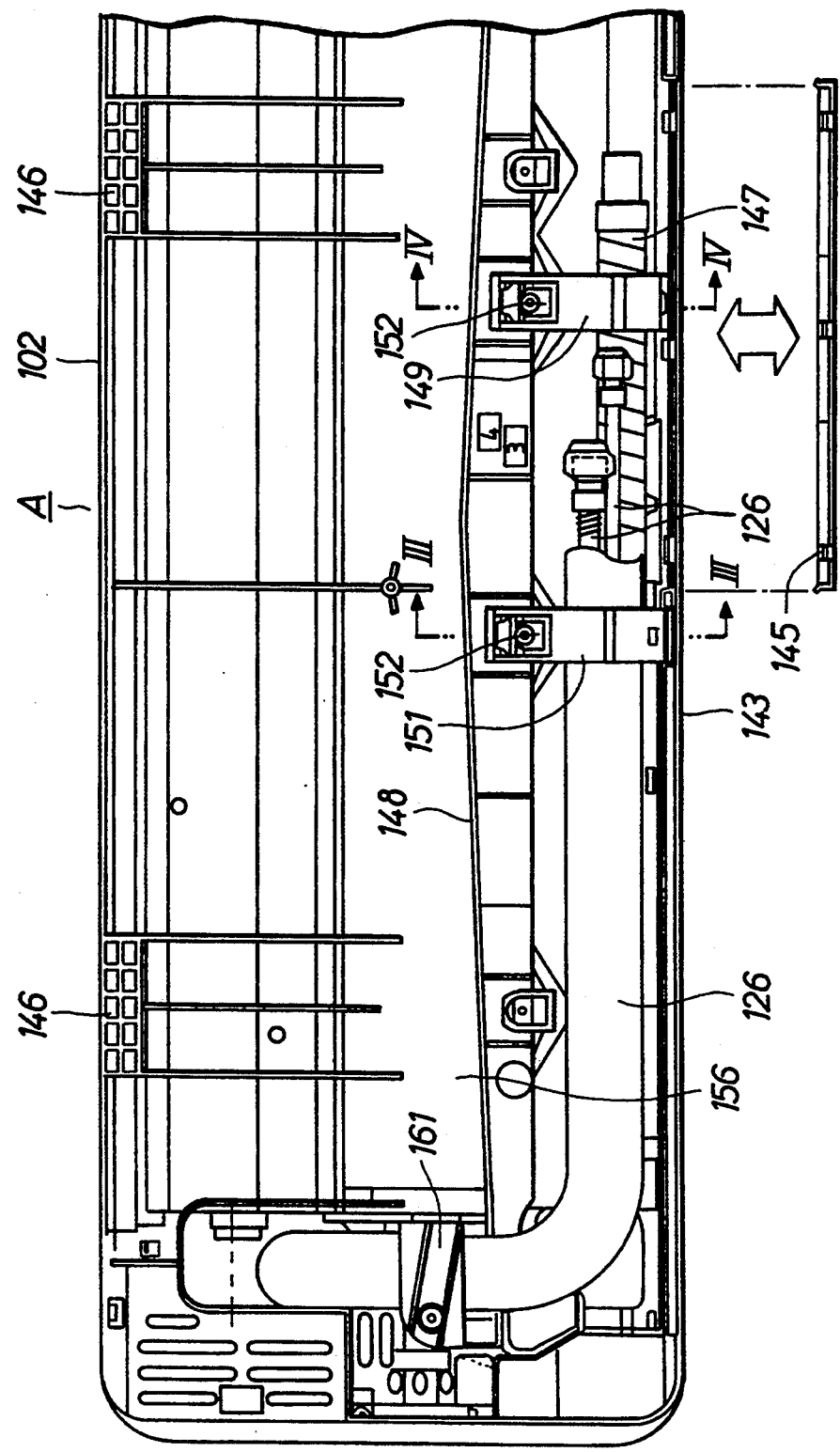
FIG. 11 is a back view of an indoor unit.
Figure 12:
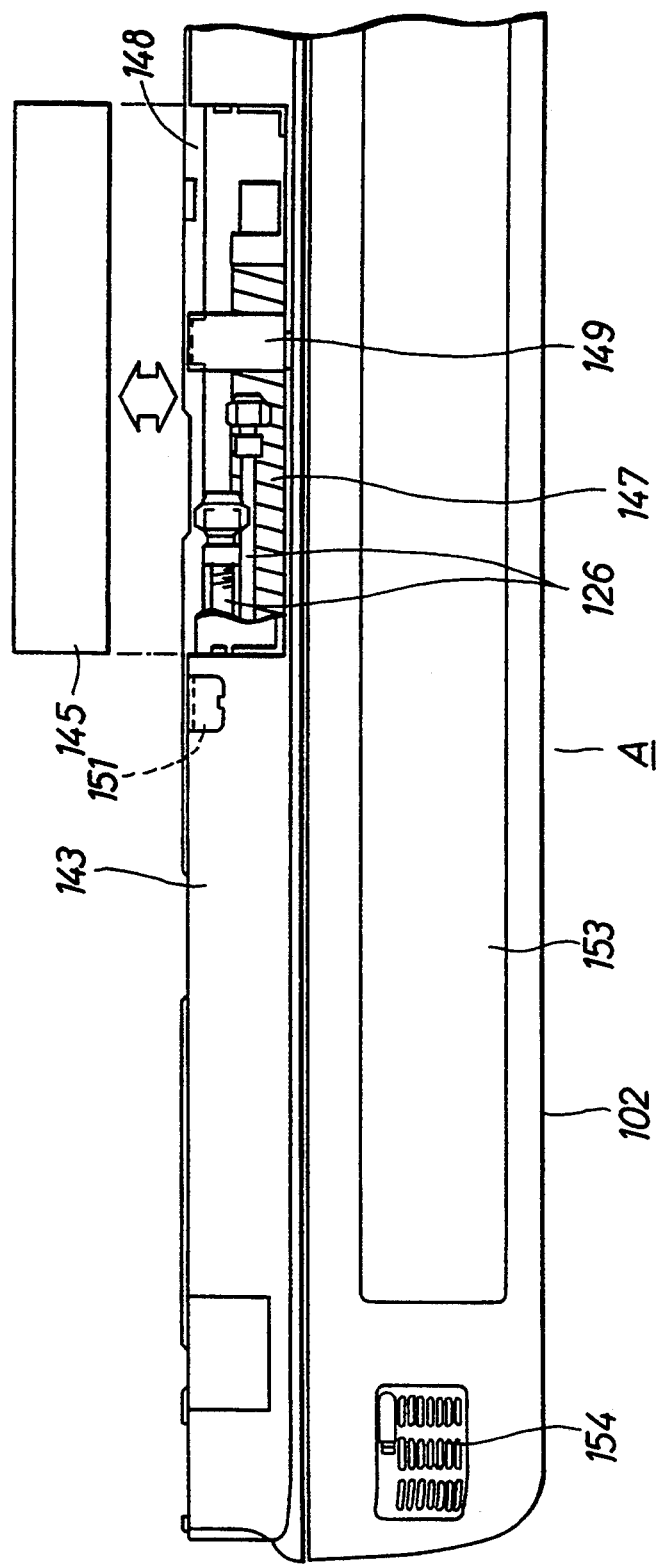
FIG. 12 is a bottom view showing a state where a pipe cover of the indoor unit is detached.

FIG. 11 is a back side view of the indoor unit A at a state where a mounting plate 141 of the air conditioner is detached from the main body 102 as shown in FIG. 6, and FIG. 12 is a bottom view of the indoor unit A.

Referring to FIGS. 11 and 12, a bottom plate 143 is provided at the lower portion of the main body 102, and a space located along the inner wall of the bottom plate 143 serves as an accommodating space for a refrigerant pipe 126 which is connected to the heat exchanger 120. The bottom plate 143 is provided with a cut-out portion for a connection work of the refrigerant pipe 126 and a pipe cover 145 for closing the cut-out portion, which is freely detachable from the bottom plate 143.

Reference numeral 146 represents a hook piece to be hung on the mounting plate 141 which is beforehand fixed on a wall 150 (see FIG. 13) in a room; 147, a drain hose for discharging drain from a drain pan 125; 148, a drain receiver for receiving drain on the back surface of the main body 102; and 149, a presser member for pressing the refrigerant pipe 300 (see FIG. 3) through which the refrigerant pipe 126 and the outdoor unit B are connected to each other. The presser member 149 is disposed to confront the cut-out portion, and thus it is exposed when the pipe cover 145 is removed.

Reference numeral 151 represents a presser member for pressing from the back side of the main body 102 the refrigerant pipe 126 accommodated in the in the accommodating space, and it is fixed to the main body 102 by a fastener 152. Reference numeral 153 represents an air blow-out port which is formed at the lower portion on the front surface of the main body 102, and a wind-direction plate (not shown) is provided at the blow-out portion.

Figure 14:
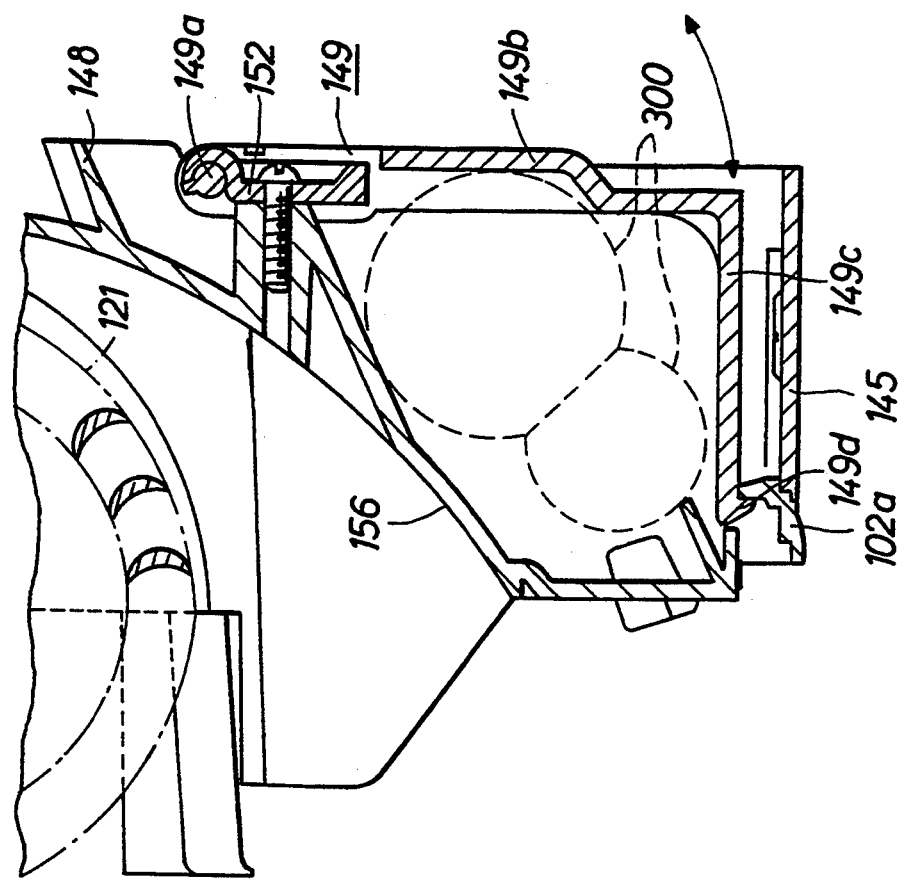
FIG. 14 is a cross-sectional view of the indoor unit which is taken along a line III—III of FIG. 9.
Figure 15:
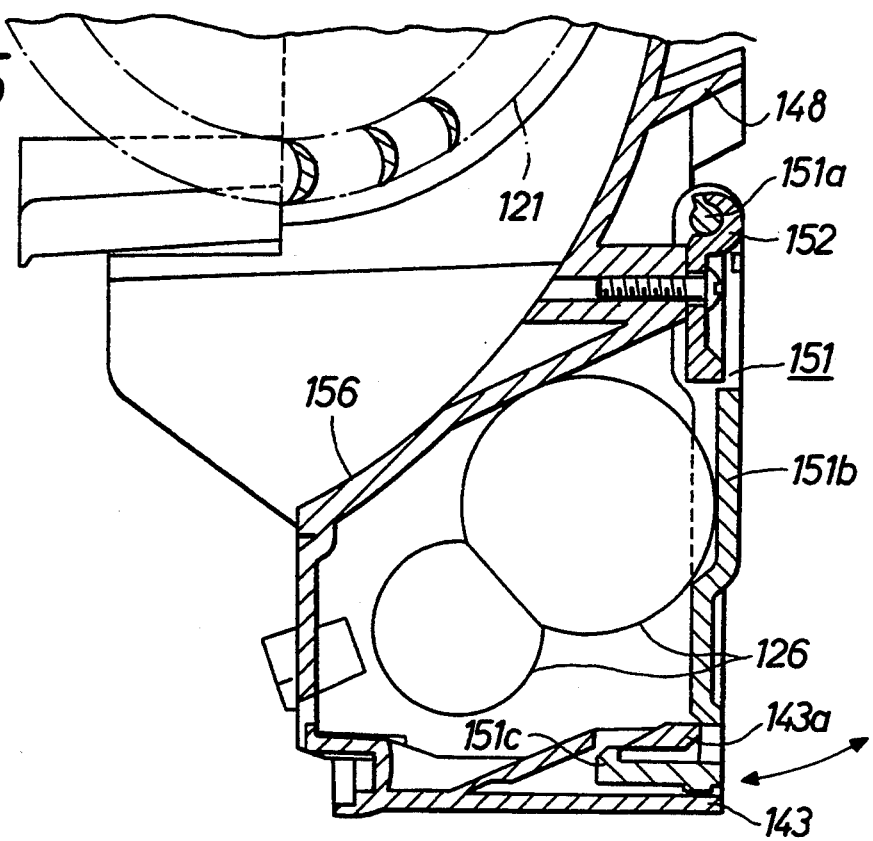
FIG. 15 is a cross-sectional view of the indoor unit which is taken along a line IV—IV of FIG. 9.

FIGS. 14 and 15 are cross-sectional views of the air conditioner which are taken along lines III—III and IV—IV in FIG. 11, respectively.

The presser member 149 is provided with a shaft 149a which is freely rotatably secured to the fastener 152, a presser element 149b for pressing the refrigerant pipe 300 from the back side of the main body 102, a presser element 149c for pressing the refrigerant pipe 300 from the side of the pipe cover 145 of the main body 102, and a hook element 149b which is hung on the lower portion of the main body 102.

Referring to FIG. 15, the presser member 151 is provided with a shaft 151a which is freely rotatably secured to the fastener 152, a presser element 151b for pressing the refrigerant pipe 126 from the back side of the main body 102, and a hook element 151c which is hung on the bottom plate 143a at the accommodating space side of the main body 102. Reference numeral 156 represents a casing constituting an air path for the blow-out air.

Next, the procedure of mounting the indoor unit A on the wall in the room will be described. The following description is made representatively to the mounting procedure for a left-pipe type indoor unit A in which the refrigerant pipe 300 directed to the outdoor unit B is guided through a penetrating hole provided at the left back surface side of the main body 102.

Figure 13:
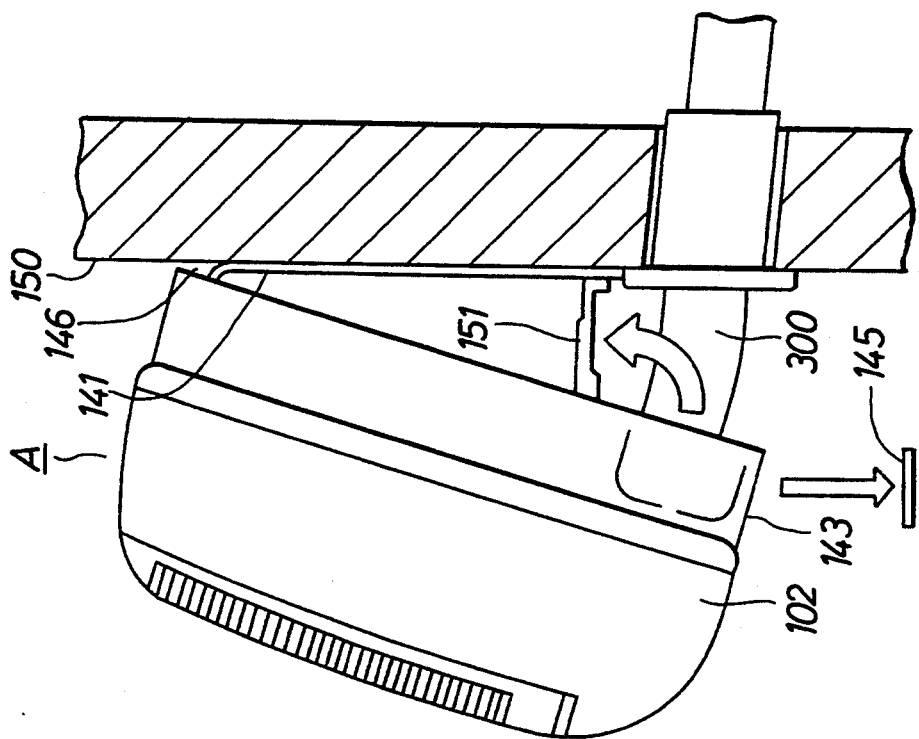
FIG. 13 is an explanatory diagram showing a state where the indoor unit is secured.

First, the hook piece 146 is hung on the mounting plate 141 which is secured on the wall 150 in the room (see FIG. 13). Subsequently, the pipe cover 145 is removed in a direction as indicated by an arrow, the hook element 149d of the presser member 149 is removed from the lower portion 102a of the main body 102 as shown in FIG. 14, and the hook element 151c of the presser member 151 is removed from the bottom plate 143a as shown in FIG. 15. Thereafter, the presser member 151 is rotated to allow the hook element 151c of the presser member 151 abut against the mounting plate 141, thereby keeping the lower portion of the main body 102 away from the mounting plate 141.

A large working space in which the refrigerant pipe 126 and the refrigerant pipe 300 are connected to each other is formed because the pipe cover 143 is removed and the lower portion of the main body 102 is kept away from the mounting plate 141, and thus the connection work of the refrigerant pipes 126 and 300 is more facilitated.

After the connection working is terminated, the presser member 149 is inversely rotated to engage the hook element 149d with the lower portion 102a of the main body 102. In this state, the refrigerant pipe 300 is pressed into the accommodating space from the back side of the main body 102 by the presser element 149b, and also pressed from the bottom side of the main body 102 by the presser element 149c.

Therefore, floating of the lower portion 102a of the main body 102 and detachment of the pipe cover 143 which have been conventionally caused by insufficient pressing of the refrigerant pipe 300 can be effectively prevented.

Subsequently, the presser member 151 is rotated to engage the hook element 151c with the bottom plate 143a, whereby the refrigerant pipe 126 is pressed into the accommodating space from the back side of the main body 102 by the presser element 151b of the hook piece 151, and the refrigerant pipe 126 is pressed from the side of the bottom plate 143a of the main body 102 by the bottom plate 143a of the accommodating space side. Therefore, the floating of the lower portion 102a of the main body 102 which has been conventionally caused by insufficient pressing of the refrigerant pipe 126 can be prevented.

As described above, the refrigerant pipe 126 in the accommodating space is pressed by the presser member 151 and at the same time the refrigerant pipe 300 is pressed by the presser member 149, that is, both of the refrigerant pipes 126 and 300 are pressed, so that the floating of the lower portion 102a of the main body 102 can be more effectively prevented in comparison with the conventional air conditioner in which only the refrigerant pipe 126 is pressed.

Finally, the pipe cover 145 is secured to the cut-out portion at the lower portion of the main body 102 to terminate the mounting procedure of the indoor unit A.

Referring to FIG. 11, the refrigerant pipe 126 is beforehand secured at the side portion of the casing 156 by a pipe presser member 161. This casing 156 is used to form an air path for the blow-out air as shown in FIGS. 14 and 15.

Next, the construction of the pipe presser member 161 will be described in detail.

Figure 16:
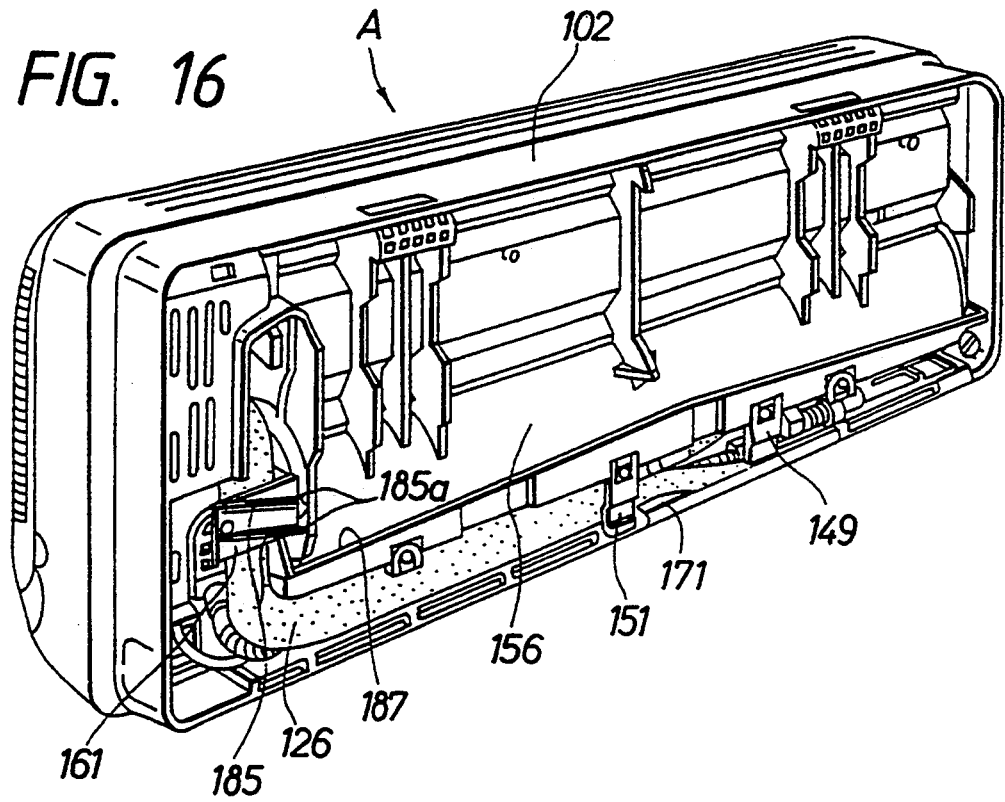
FIG. 16 is a perspective view of the back side of the air conditioner.

FIG. 16 is a perspective view of the indoor unit A which is viewed from the back side. The refrigerant pipe 126 connected to the heat exchanger 120 is guided along the side of the casing 156 of the main body 102 from the front side thereof to the back side thereof, and accommodated in the accommodating space (hereinafter referred to as "lower space" 171) at the lower portion of the main body 102. The refrigerant pipe 126 is wound by a heat insulator, and pressed in the lower space 171 of the main body 102 by the two presser members 149 and 151 while pressed at the side of the casing 156 by the pipe presser member 161 as described above.

Figure 17:
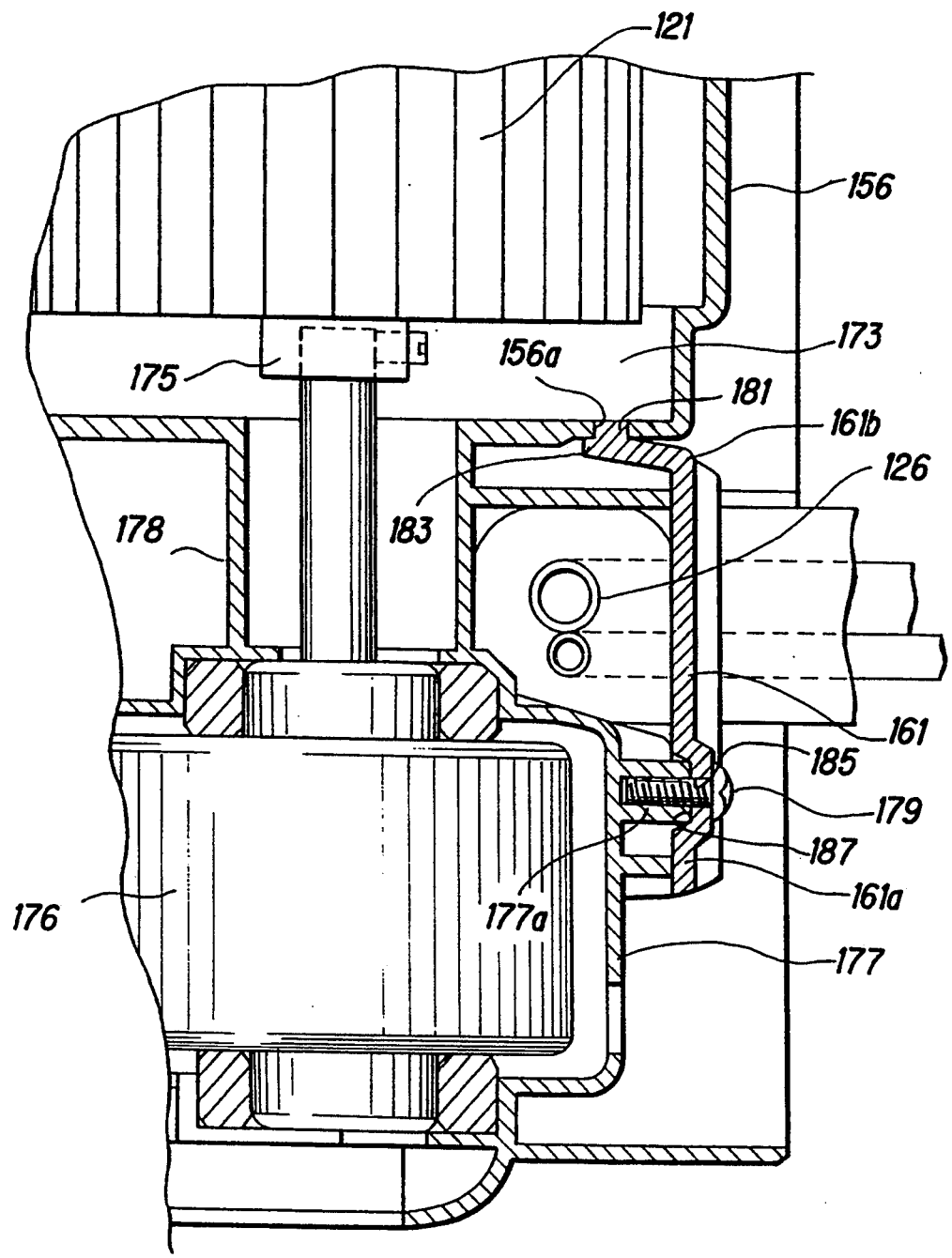
FIG. 17 is a cross-sectional view showing a state where a presser member for the air conditioner is secured.

The above construction will be described in more detail. Referring to FIG. 17, the casing 156 as described above defines a ventilation flue 173 at the inner side thereof, and the cross flow fan 121 as described above is disposed in the ventilation flue 173. The cross flow fan 121 is connected to the motor 176 through the coupling 175, and the motor 176 is accommodated in a motor case 31 which is integrally connected to the casing 156.

The refrigerant pipe 126 is passed through a gap between the motor case 177 and the casing 156. The refrigerant pipe 126 is so designed that one end thereof extends upwardly in a direction perpendicular to the drawing of FIG. 17, then extends to the left (to the front of the main body 102) at the upper portion of the coupling casing 178 and then connected to the heat exchanger 120 at the front surface side of the main body 102. On the other hand, the other end of the refrigerant pipe 126 extends downwardly in the direction perpendicular to the drawing of FIG. 17, bent in the lower space 171 of the main body 102 as shown in FIG. 16, and then allowed to be connected to the outdoor unit B.

The refrigerant pipe 126 is fixedly secured to the side of the casing 156 by the pipe presser member 161 as described above, and the detailed construction of the pipe presser member 161 will be described.

The one end 161a of the pipe presser member 161 is secured to a boss portion 177a of the motor case 177 through a screw 179, and the other end 161b is engagedly inserted into an opening 156a formed in the casing 156. The other end 161b of the pipe presser member 161 is formed with a projection element 181 and an extension element 183. When the other end 161b is engaged with the opening 156a, the projection element 181 is inserted into the opening 156a so as to be filled in the opening 156a and thus it serves to close the opening 156a. On the other hand, when the other end 161b is engaged with the opening 156a, the extension element 183 is contacted with the outer surface of the casing 156 under pressure and serves to prevent the air to flow in through a gap between the other end 161b and the casing 156. The projection element 181 and the extension element 183 constitute an obturator for obturating or closing the opening 156a. Further, the one end 161a of the pipe presser member 161 is formed with a screw hole 185 and a substantially cylindrical recess portion 187 (including a truncated cone or other similar shapes).

In order to press the refrigerant pipe 126 using the pipe presser member 161 as described above, the other end 161b the pipe presser member 161 is first engagedly inserted into the opening 156a of the casing 156, then the boss portion 177a is engaged with the recess portion 187 of the one end 161a, and finally the recess portion 187 and the boss portion 177a are fixed to each other through the screw 179.

According to the construction of the pipe presser member 161, the opening 156a is completely obturated by the projection element and the extension element 183 at the stage where the other end 161b is engagedly inserted into the opening 156a. Therefore, unlike the conventional air conditioner, it is not necessary to seal the opening 156a with putty or the like and thus the air can be completely prevented from flowing in through the opening 156a. In addition, since the boss portion 177a is engaged with the substantially cylindrical recess portion 187, the one end 161a is not moved during the securing work of these elements using the screw 179, and thus the deviation of the pipe presser member 161 can be surely prevented.

Another embodiment of the pipe presser member 161 will be hereunder described.

As shown in FIG. 16, a rib 185 which is designed to be inclined to the side of the casing 156 is provided on the surface of the pipe presser member 161, and the tip 185a of the rib 185 is designed to be directed to the drain pan 187 at the lower end of the casing 156. According to this embodiment, even if drain occurs on the surface of the pipe presser member 161, the drain could be guided to the drain pan 187, and thus the drain can be surely trapped.

Next, the driving mechanism of the longitudinal vanes 122 which is disposed behind the horizontal vanes 105 at the air blow-out port 106 will be described with reference to FIGS. 18 to 20.

Figure 18:
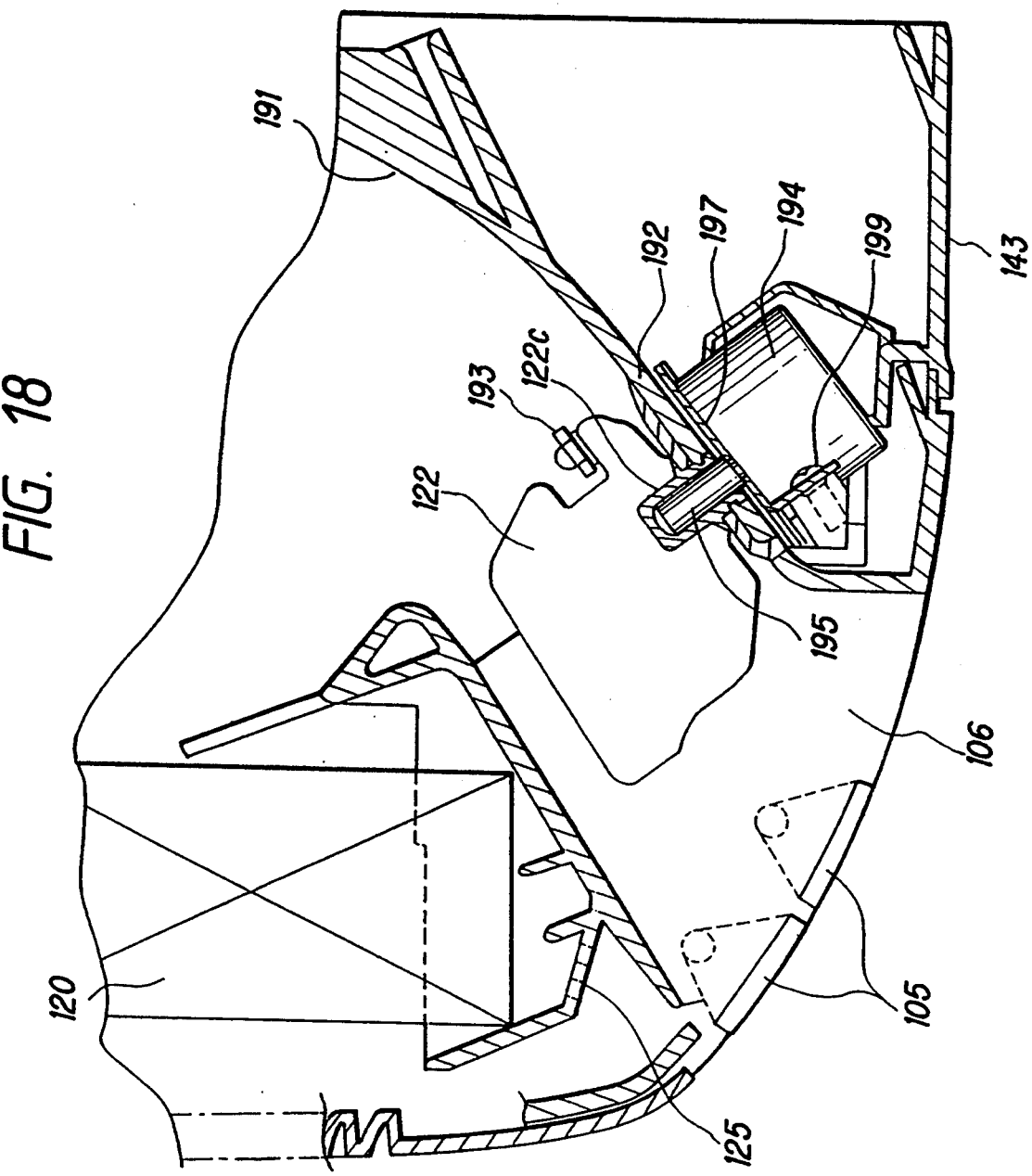
FIG. 18 is a cross-sectional view of an air blow-out port of the air conditioner.

FIG. 18 shows the construction of the air blow-out port 105. The air blow-out port 105 is constructed by the drain pan 125 on which the heat exchanger 120 is mounted, and the front edge 191 of a scroll portion 191 (a part of the casing) for guiding the air to the air blow-our port 105, which is provided at the lower side of the cross flow fan 121. At the air blow-out port 105 are provided two lateral wind-direction altering vanes 105 for altering the wind direction in upward and downward directions, and plural longitudinal wind-direction altering vanes 122 for altering the wind-direction in right and left directions. That is, the whole wind direction is controlled by the combination of these wind-direction altering vanes 105 and 122.

The driving mechanism for the longitudinal wind-direction altering vanes for altering the wind direction in the right and left directions will be representatively described hereunder in detail.

Figure 19:
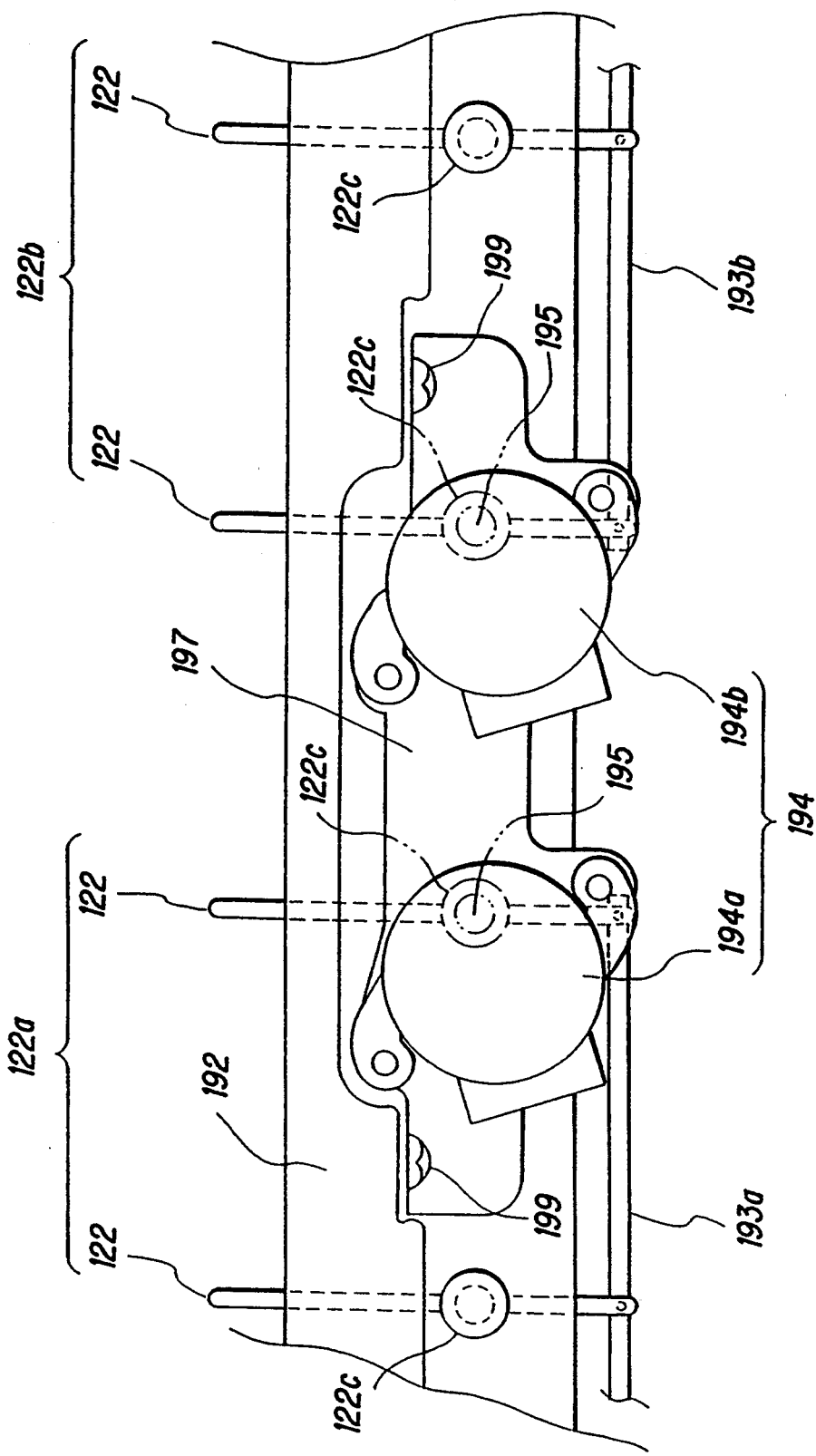
FIG. 19 is a flat view showing a driving unit for a wind-direction altering vane.
Figure 20:
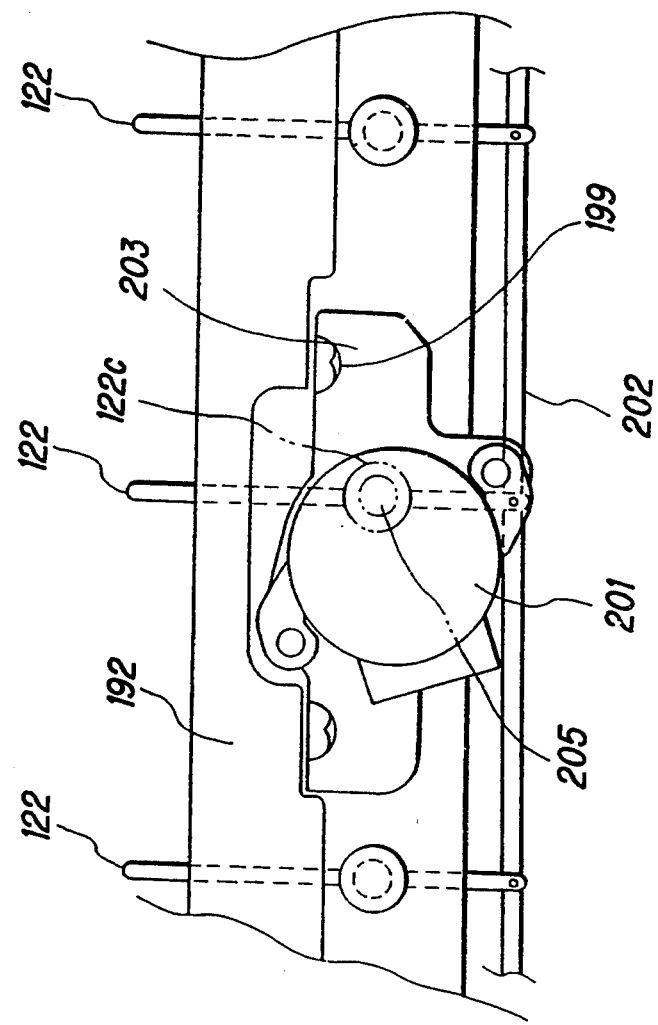
FIG. 20 is a plane view showing another embodiment of the driving unit for the wind-direction altering vane.

As shown in FIG. 19, a set of longitudinal wind-direction altering vanes 122 are divided into two groups 122a and 122b through two interlocking bars 193 (193a and 193b). One group 122a of the vanes are interlockingly connected to each other through the interlocking bar 193a while the other group 122b of the vanes are interlockingly connected to each other through the interlocking bar 193b. Two motors 194 (194a and 194b) are provided to drive these vane groups. As is apparent from FIGS. 18 and 19, the two motors 194a and 194b are mounted between the front edge 192 of the scroll portion 191 and the bottom plate 143, and the output shafts 195 of these motors 194a and 194b are engagedly inserted into holes of shafts 122c of the wind-direction altering vanes 122 which penetrate through the front edge 192.

According to this embodiment, the two motors 194a and 194b are disposed just at the central portion of the air blowout port 106, and collectively embedded at the back side of the front edge 192 of the scroll portion 191. These motors 194a and 194b are secured to one support plate 197, which is fixed to the back side of the front edge 192 through machine screws 199, and the output shafts 195 of the motors 194a and 194b are engagedly inserted into the shaft portions 122c (driving shafts) of the wind-direction altering vanes 122 which are adjacent to each other at the central portion of the air blow-out port 106, respectively.

Each of the motors 194a and 194b comprises a stepping motor. In response to a wind-direction altering instruction from a controller (not shown), the motors 194a and 194b are driven and the output shafts 195 thereof are rotated, thereby performing the wind-direction altering operation. The motors 194a and 194b are driven independently of each other, and thus any wind-direction control, such as a control operation that the one group 122a is directed to the right while the other group 122b is directed to the left for example, may be performed.

As described above, the motors 194 are embedded at the back side of the front edge 192 of the scroll portion 191, and the output shafts 195 of the motors 194 are directly linked to the driving shafts 122 of the wind-direction altering vanes 122. Therefore, unlike the conventional air conditioner, no link for connection or the like is required and thus the driving mechanism an be simplified.

In the above embodiment, the longitudinal wind-direction altering vanes 122 are divided into two groups, and these groups 122a and 122b are independently driven by the two motors 194a and 194b. However, this invention is not limited to the above construction. For example, As shown in FIG. 20, all of the wind-direction altering vanes 122 may be driven using only one motor 201. In this case, all the wind-direction altering vanes 122 are linked to one another through one linking bar 202, and the motor 201 is mounted on one support plate 203 and disposed at the central portion of the air blow-out port or in the neighborhood of the central portion. The output shaft 205 of the motor 201 is engaged with the shaft portion 122c of the wind-direction altering vane 122 which is located at the position confronting the output shaft 205. The motor 201 may be directly secured at the back side of the front edge 192 using no support plate 203.

As is apparent from the foregoing, according to this invention, the air filter member which is secured to the air suction port of the air conditioner is constructed by the frame body and the mesh secured to the frame body, and the frame body is formed with the support piece which will be secured to the edge of the air suction port. In the air filter member thus constructed, a specific portion of the frame body is designed to be wider than the other portions of the frame body, and the support piece is disposed at the specific portion of the frame body. Therefore, even when the joint portion between the frame body and the mesh is formed away from the support piece, the mechanical strength of the support piece can be prevented from being reduced, and thus the damage such as bending, breaking or the like can be surely prevented. In addition, the width of the surrounding portion of the joint portion can be kept to be substantially equal to that of the other portions of the joint portion, so that the mesh is hardly detached from the frame body, that is, the attachment of the mesh to the frame body is stably fixed.

What is claimed is:

1. An air conditioner comprising an indoor unit having at least an indoor-side heat exchanger and an outdoor unit having at least an outdoor-side heat exchanger, said air conditioner implementing a refrigeration cycle with a compressor, the indoor-side heat exchanger (120), an expansion device and the outdoor-side heat exchanger, the improvement wherein said indoor unit comprises:

an air suction port for sucking air to be air-conditioned;

an air blow-out port (106) for discharging the air-conditioned air;

an air blowing unit (121) defining an air flow path along which the air supplied from said air suction port is discharged from said air blow-out port after being heated or cooled in said indoor-side heat exchanger;

an air filter (123) detachably disposed in said indoor unit between said air suction port and said indoor-side heat exchanger in said air flow path, and comprising a frame body (132) and a filter mesh (133) secured to said frame body, wherein a bottom of said frame body has a widened portion (140) which is wider than other portions thereof, and an outwardly extending support post (130) formed at the widened portion of said frame body such that said outwardly extending support post is not located at a joint portion (139) between said frame body and said filter mesh, and disposed at an edge of said air suction port when said air filter is disposed in said indoor unit; and an engaging member engageable with said support post of said air filter frame body to fixedly secure said air filter to said indoor unit, wherein the upper portion of the indoor-side heat exchanger is bent toward the air blowing unit.

2. The air conditioner as claimed in claim 1, further comprising a set of rotatable vanes (122) for changing the direction of air discharged from said air blow-out port, and at least one stepping motor (194) having a rotational shaft linked to at least one shaft of said vanes, said stepping motor being disposed out of said air flow path and serving to rotate said vanes at any angle.

3. The air conditioner as claimed in claim 1, wherein said widened portion of the frame body projects upwardly onto said mesh.

4. The air conditioner as claimed in claim 3, wherein said widened portion is arcuate.

5. The air conditioner as claimed in claim 1, wherein said support post is integrally formed with said frame body.

6. The air conditioner as claimed in claim 1, wherein the engaging member comprises latch means (131) defined in a lower portion of a main body (102) of said indoor unit.

7. The air conditioner as claimed in claim 1, wherein the air filter is curved along the indoor-side heat exchanger.

8. The air conditioner as claimed in claim 7, wherein the air filter is formed of synthetic resin, a tip of the air filter abuts against an inner surface of an upper portion of the indoor unit, and a hook member (141) of the air filter is engaged with a recess portion such that the air filter is elastically and engageably suspended between said inner surface and said recess portion.

9. The air conditioner as claimed in claim 8, wherein the air filter is inserted along a filter guide from a lower side to an upper side so as to be secured in the air suction port of the indoor unit.

10. The air conditioner as claimed in claim 6, wherein said latch means comprises at least one slot for receiving the support post therein.

11. The air conditioner as claimed in claim 10, wherein the air filter frame body has a single support post.

* * * * *